United States Patent
Poll et al.

(10) Patent No.: US 6,972,888 B2
(45) Date of Patent: Dec. 6, 2005

(54) ELECTROCHROMIC WINDOWS AND METHOD OF MAKING THE SAME

(75) Inventors: David L. Poll, Holland, MI (US); Kevin L. Ash, Grand Rapids, MI (US); David A. Theiste, Byron Center, MI (US); Thomas F. Guarr, Holland, MI (US); William L. Tonar, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 11/032,642

(22) Filed: Jan. 10, 2005

(65) Prior Publication Data

US 2005/0117193 A1 Jun. 2, 2005

Related U.S. Application Data

(62) Division of application No. 10/713,792, filed on Nov. 14, 2003, now Pat. No. 6,842,276, which is a division of application No. 10/349,829, filed on Jan. 23, 2003, now Pat. No. 6,671,080, which is a division of application No. 09/989,619, filed on Nov. 20, 2001, now Pat. No. 6,594,067, which is a division of application No. 09/626,714, filed on Jul. 25, 2000, now Pat. No. 6,407,847.

(51) Int. Cl.[7] .......................... G02F 1/15; G02F 1/153; G02F 1/00; H01R 12/24
(52) U.S. Cl. ...................... 359/265; 359/275; 252/583; 439/493
(58) Field of Search ............................ 359/265–275; 252/582, 583, 586; 439/493, 857

(56) References Cited

U.S. PATENT DOCUMENTS 4,640,583 A 2/1987 Hoshikawa et al.
4,671,619 A 6/1987 Kamimori et al.
4,702,566 A 10/1987 Tukude
4,893,908 A 1/1990 Wolf et al.
4,958,917 A 9/1990 Hashimoto et al.

(Continued)

FOREIGN PATENT DOCUMENTS

DE 3128964 2/1983

(Continued)

OTHER PUBLICATIONS

R. Sullivan et al., "Effect of Switching Control Strategies on the Energy Performance of Electrochromic Windows," SPIE, p. 443-455, Yr/1994.

(Continued)

Primary Examiner—Georgia Epps
Assistant Examiner—Jack Dinh
(74) Attorney, Agent, or Firm—Price, Heneveld, Cooper, DeWitt & Litton, LLP

(57) ABSTRACT

An electrochromic window assembly is disclosed that includes a first substrate and a second substrate that is maintained in a parallel and spaced relation from the first substrate by means of a window frame and spacer. The window assembly further includes an electrochromic device mounted within the airtight chamber formed between the first and second substrates. Electrochromic device 22 may be mounted so as to provide an air chamber between first substrate 12, which is the external substrate, and electrochromic device 22. At least one of the chambers formed between substrates 12 and 14 and electrochromic device 22 may be filled with an insulating gas such as argon. Also disclosed are novel methods for manufacture of an electrochromic device for incorporation into such a window assembly. A novel electrochromic device is also disclosed having electrical bus clips secured about the entire periphery of the electrochromic device.

22 Claims, 9 Drawing Sheets

U.S. PATENT DOCUMENTS

| | | | |
|---|---|---|---|
| 5,066,111 A | 11/1991 | Singleton et al. |
| 5,076,673 A | 12/1991 | Lynam et al. |
| 5,124,832 A | 6/1992 | Greenberg et al. |
| 5,136,419 A | 8/1992 | Shabrang |
| 5,161,048 A | 11/1992 | Rukavina |
| 5,336,448 A | 8/1994 | Byker |
| 5,384,653 A | 1/1995 | Benson et al. |
| 5,657,149 A | 8/1997 | Buffat et al. |
| 5,724,176 A | 3/1998 | Nishikitani et al. |
| 5,725,809 A | 3/1998 | Varaprasad et al. |
| 5,856,211 A | 1/1999 | Tonazzi et al. |
| 5,889,608 A | 3/1999 | Buffat et al. |
| 5,995,273 A | 11/1999 | Chandrasekhar |
| 6,045,724 A | 4/2000 | Varaprasad et al. |
| 6,055,088 A | 4/2000 | Fix et al. |
| 6,064,509 A | 5/2000 | Tonar et al. |
| 6,084,702 A | 7/2000 | Byker et al. |
| 6,207,083 B1 | 3/2001 | Varaprasad et al. |
| 6,317,248 B1 | 11/2001 | Agrawal et al. |
| 6,373,618 B1 | 4/2002 | Agrawal et al. |
| 6,407,847 B1 | 6/2002 | Poll et al. |
| 6,449,082 B1 | 9/2002 | Agrawal et al. |
| 6,594,067 B2 | 7/2003 | Poll et al. |
| 6,671,080 B2 | 12/2003 | Poll et al. |

FOREIGN PATENT DOCUMENTS

| | | |
|---|---|---|
| DE | 8507963 | 7/1986 |
| EP | 0947874 | 10/1999 |
| EP | 0947875 | 10/1999 |
| EP | 0947876 | 10/1999 |
| EP | 0964288 | 12/1999 |
| WO | WO 9857228 | 12/1998 |

OTHER PUBLICATIONS

A.W. Czanderna et al., "Durability Issues and Service Lifetime Prediction of Electrochromic Windows for Buildings Applications," Solar Energy Materials & Solar Cells, 56 ed., p. 419-436, Yr/1999.

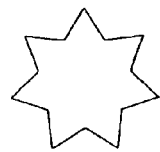
FIG. 2A
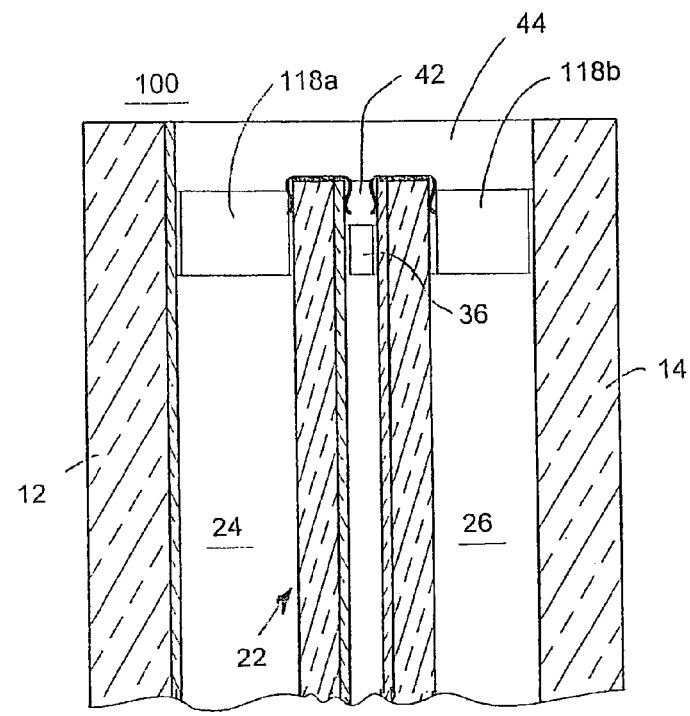
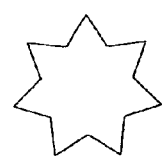
FIG. 2B
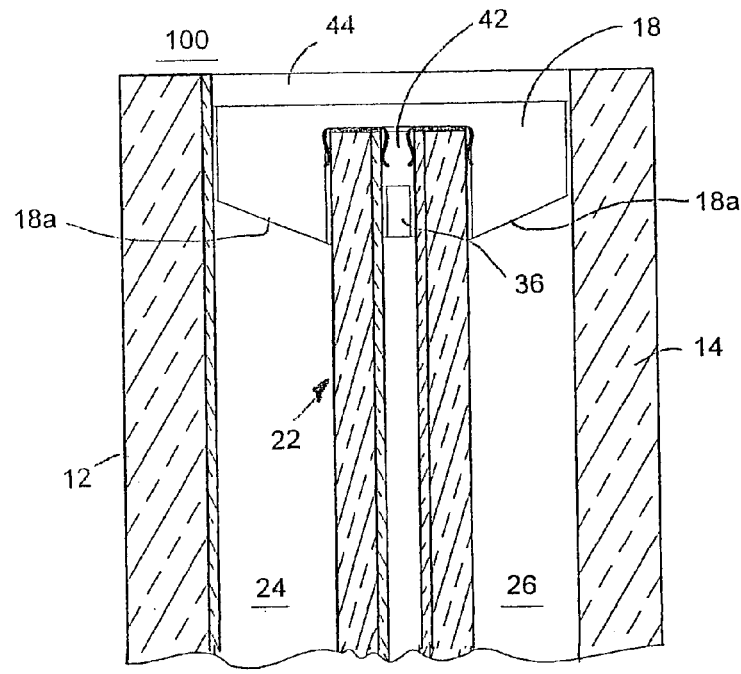

ELECTROCHROMIC WINDOWS AND METHOD OF MAKING THE SAME

CROSS-REFERENCE TO RELATED APPLICATIONS

This application is a divisional of U.S. patent application Ser. No. 10/713,792, filed on Nov. 14, 2003, now U.S. Pat. No. 6,842,276, which is a divisional of U.S. patent application Ser. No. 10/349,829, filed on Jan. 23, 2003, now U.S. Pat. No. 6,671,080, which is a divisional of U.S. patent application Ser. No. 09/989,619, filed on Nov. 20, 2001, now U.S. Pat. No. 6,594,067, which is a divisional of U.S. patent application Ser. No. 09/626,714, filed on Jul. 25, 2000, now U.S. Pat. No. 6,407,847, the entire disclosures of which are incorporated herein by reference.

BACKGROUND OF THE INVENTION

The present invention generally relates to windows having variable transmittance light filters, and more specifically to windows including electrochromic light filters.

Variable transmittance light filters, such as electrochromic light filters, have been proposed for use in architectural windows, skylights, and in windows and sunroofs for automobiles. Such electrochromic light filters reduce the transmittance of direct or reflected sunlight during daytime through the window, while not reducing such transmittance during nighttime. Not only do such light filters reduce bothersome glare and ambient brightness, but they also reduce fading of interior materials and heat load caused by the transmittance of sunlight through the window.

Electrochromic windows have not been widely accepted commercially for several reasons. First, they tend to be very expensive due to the cost of materials required for their construction, and their complex construction makes mass production difficult. Additionally, electrochromic windows have tended to have a lower life expectancy than conventional windows due to degradation of the electrochromic materials used in the window. The combination of added cost and lower life expectancy has deterred many architects and builders from using electrochromic windows.

SUMMARY OF THE INVENTION

Accordingly, an aspect of the present invention is to provide an improved electrochromic window construction. More specifically, an aspect of the invention is to provide an electrochromic window that is easier to mass-produce and that utilizes less expensive components and lower quantities of the costlier components. Another aspect of the present invention is to provide an electrochromic window that exhibits markedly improved color stability. Still another aspect of the present invention is to provide an electrochromic window having improved thermal deflection/emission characteristics. Yet another aspect of the invention is to provide an electrochromic window having an improved seal construction.

To achieve these and other aspects and advantages, a window of one embodiment of the present invention comprises a first substrate, a second substrate, a spacer for spacing and maintaining the first and second substrates in a generally parallel, spaced-apart relation, and a variable-transmittance device disposed between and spaced apart from the first and second substrates thereby defining a first chamber between the first transparent element and the variable-transmittance device, and a second chamber between the second transparent element and the variable-transmittance device. The variable-transmittance device is preferably an electrochromic device.

Another embodiment of the invention pertains to a method of making an electrochromic device that comprises the steps of (1) providing an assembly including a first substrate and a second substrate spaced apart and joined by a seal to form a sealed chamber between inner surfaces of the substrates, at least one (or both) of the first and second substrates including an aperture extending between the outer surface of the substrate and the chamber; (2) filling the chamber with an electrochromic solution or an electrolytic solution through the aperture; (3) placing a plug in the aperture; and (4) adhering a thin plate over the plugged aperture.

Another embodiment of the invention pertains to a method of making an electrochromic device comprising the steps of (1) providing a first substrate; (2) adhering a first surface of a pre-formed seal gasket onto a first surface of the first substrate proximate the periphery thereof, the seal gasket having adhesive pre-applied to a second surface opposite the first surface, and having a release liner attached to the adhesive on the second surface of the seal gasket; (3) removing the release liner from the second surface of the seal gasket; and (4) aligning a second substrate with the first substrate and pressing a first surface of the second substrate onto the adhesive on the second surface of the seal gasket.

According to yet another embodiment, a window of the present invention comprises an electrochromic medium having color stability defined as (1) a change in color ΔE of less than 5 measured in its activated or darkened state after being exposed to 700 hours in a weatherometer while cycling; and (2) a change in color, ΔE, of less than 5 measured in its deactivated or clear state after being exposed to 700 hours in a weatherometer while cycling, each cycle consists of applying a voltage of 1.2V for 20 sec. and 0.0V for 40 sec.

According to still yet another embodiment, a window of the present invention comprises a first substrate, a second substrate, a spacer for spacing and maintaining the first and second substrates in a generally parallel, spaced-apart relation, and first and second variable-transmittance devices disposed between the first and second substrates and spaced apart from each other. The variable transmittance devices are preferably electrochromic devices.

According to another embodiment, an electrochromic device of the present invention comprises first and second transparent elements joined by a seal in a parallel, spaced-apart relation to form a chamber therebetween, a first transparent electrode disposed over the inner surface of the first element, a second transparent electrode disposed over the inner surface of the second element, the first and second electrodes being electrically isolated from one another, an electrochromic medium disposed within the sealed chamber, a first electrical conductor electrically coupled to the first electrode about the entire perimeter of the first electrode, and a second electrical conductor electrically coupled to the second electrode about the entire perimeter of the second electrode.

According to another embodiment, an electrochromic device of the present invention comprises a first substrate and a second substrate spaced apart and joined by a seal to form a sealed chamber between inner surfaces of the substrates, the substrates being positioned to have at least a first edge generally aligned with the first edge of the other substrate, a first electrode disposed on the inner surface of the first substrate, a second electrode disposed on the inner surface of the second substrate, the first and second electrodes being electrically isolated from one another, an electrochromic medium disposed within the sealed chamber, a first electrical connector clip attached to the first electrode and to the first substrate along at least the first edge thereof, and a second electrical connector clip attached to the second electrode and to the second substrate along at least the first edge thereof, wherein the first and second electrical connector clips include a plurality of spaced-apart fingers that respectively contact the first and second electrodes, the fingers of one connector clip being spaced apart from one another by a distance greater than the width of the fingers of the other connector clip such that the fingers of both the connector clips intermesh without physically contacting the fingers of the other connector clip. The clips may be made of steel.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 2A is a cross-sectional view of a portion of an electrochromic window constructed in accordance with a second embodiment of the present invention;

FIG. 2B is a cross-sectional view of a portion of a modified version of the electrochromic window shown in FIG. 2A;

DETAILED DESCRIPTION OF THE PREFERRED EMBODIMENTS

Figure 1A:
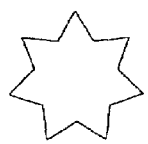
FIG. 1A is a cross-sectional view of a portion of an electrochromic window constructed in accordance with a first embodiment of the present invention.
Figure 1A:
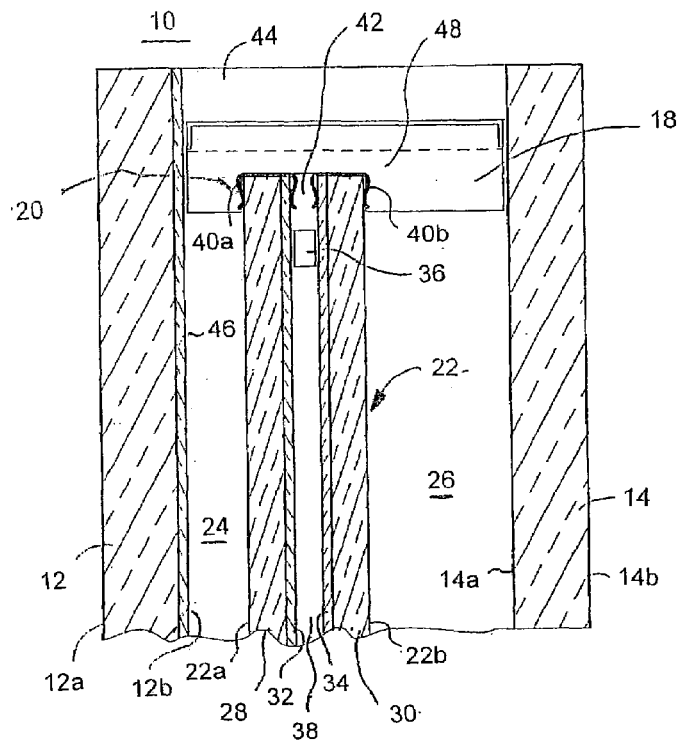

Reference will now be made in detail to the present preferred embodiments of the invention, examples of which are illustrated in the accompanying drawings. Wherever possible, the same reference numerals will be used throughout the drawings to refer to the same or like parts.

FIG. 1A shows the construction of an electrochromic window assembly 10 according to a first embodiment of the present invention. As shown, electrochromic window assembly 10 includes a first transparent substrate 12 and a second spaced-apart and parallel second transparent substrate 14. A frame (not shown) may be provided about the outer periphery of substrates 12 and 14 and about a portion of the external surface 12a of first substrate 12 and the internal surface 14b of second substrate 14. Transparent substrates 12 and 14 may be made of tempered glass, annealed, heat, or chemically strengthened or laminated glass or other transparent material. Spacing between substrates 12 and 14 is maintained by a spacer 18. Spacer 18 may be made of wood or aluminum, butyl, EPDM, silicone or other rubbers, steel, or virtually any, durable material. Spacer 18 preferably includes a groove 20 for supporting an electrochromic device 22 in a spaced-apart and parallel position between first substrate 12 and second substrate 14.

As illustrated with respect to the first embodiment shown in FIG. 1A, electrochromic device 22 is preferably positioned closer to first substrate 12 than to second substrate 14. Locating an electrochromic device 22 closer to the outer substrate of a window provides the most energy efficient construction. While in later embodiments it is proposed to integrate the electrochromic device with the first substrate such that there is no spacing therebetween so as to maximize energy efficiency, the first embodiment includes a first chamber 24 that is defined between first substrate 12 and electrochromic device 22. By spacing electrochromic device 22 from first substrate 12, resultant chamber 24 may buffer wind loading on electrochromic device 22. Further, greater flexibility is achieved in the design and material selection of first substrate 12 by not utilizing first substrate 12 as an integral element of electrochromic device 22. In other words, first substrate 12 may be made of materials that are otherwise not suitable to serve as an integral element of an electrochromic device. For example, first substrate 12 may be made of tempered glass or other materials that are not flat.

A second chamber 26 is similarly provided between electrochromic device 22 and second inner substrate 14. To provide for thermal insulation, second chamber 26 may be filled with a gas such as argon. Similarly, first chamber 24 may be filled with the same gas or, alternatively, with a different gas. For example, first chamber 24 may be filled with a gas having a higher thermal conductivity, such as helium, air, or nitrogen, which all have higher thermal conductivities than argon, which would preferably be provided in the second chamber 26. In this manner, solar energy from the sun is absorbed by the electrochromic device 22 (when in a darkened state), and the heat that is generated through this absorption is quickly transmitted via the gas in first chamber 24 back through first substrate 12 to the exterior of the window and hence outside the building. On the other hand, by providing an insulating gas such as argon in second chamber 26, the generated heat may be insulated from second substrate 14, and hence, the interior of the building. Chamber 24 can also serve as a UV blocking layer by the use of a UV absorber. Use of an absorber in solution or in a gel would also improve the thermal coupling between the electrochromic device and the outside.

With respect to the first through fourth embodiments, electrochromic device 22 may have any known construction including, for example, any of the constructions disclosed in U.S. Pat. No. 6,597,489 entitled "ELECTRODE DESIGN FOR ELECTROCHROMIC DEVICES," filed on Jun. 30, 1999, by Thomas F. Guarr et al., and U.S. Pat. No. 5,805,330, the entire disclosures of which are incorporated herein by reference.

Preferred alternative constructions are nevertheless described below with respect to FIGS. 5, 6A–6I, 7, and 8.

In general, electrochromic device 22 may include a first transparent element 28, a second transparent element 30, a first transparent electrode layer 32 applied to an inward-facing surface of first transparent element 28, a second transparent electrode 34 applied to an inward-facing surface of second transparent element 30, and a first seal 36 provided between the two layered transparent substrates. Transparent elements 28 and 30 are maintained in a generally parallel spaced-apart relation. Seal 36 serves to provide a chamber between elements 28 and 30 in which an electrochromic medium 38 is contained in contact with both transparent electrodes 32 and 34. Electrochromic medium 38 includes electrochromic anodic and cathodic materials that can be grouped into the following categories:

(i) Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. Pat. No. 6,193,912 entitled "NEAR INFRARED-ABSORBING ELECTROCHROMIC COMPOUNDS AND DEVICES COMPRISING SAME"; U.S. Pat. No. 6,188,505 entitled "COLOR STABILIZED ELECTROCHROMIC DEVICES"; U.S. Pat. No. 6,262,832 entitled "ANODIC ELECTROCHROMIC MATERIAL HAVING A SOLUBLIZING MOIETY"; U.S. Pat. No. 6,137,620 entitled "ELECTROCHROMIC MEDIA WITH CONCENTRATION ENHANCED STABILITY PROCESS FOR PREPARATION THEREOF AND USE IN ELECTROCHROMIC DEVICE"; U.S. Pat. No. 6,195,192 entitled "ELECTROCHROMIC MATERIALS WITH ENHANCED ULTRAVIOLET STABILITY"; U.S. Pat. No. 6,392,783, entitled "SUBSTITUTED METALLOCENES FOR USE AS AN ANODIC ELECTROCHROMIC MATERIAL AND ELECTROCHROMIC MEDIA AND DEVICES COMPRISING SAME"; and U.S. Pat. No. 6,249,369 entitled "COUPLED ELECTROCHROMIC COMPOUNDS WITH PHOTOSTABLE DICATION OXIDATION STATES" disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572, entitled "IMPROVED ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing architectural windows.

The anodic and cathodic materials can be combined or linked by a bridging unit as described in International Application No. PCT/WO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer or partial layer on the electronically conducting electrode when electrochemically oxidized or reduced.

Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201 entitled "AN ELECTROCHROMIC MIRROR WITH TWO THIN GLASS ELEMENTS AND A GELLED ELECTROCHROMIC MEDIUM," filed on Apr. 2, 1997. The entire disclosure of this U.S. patent is incorporated herein by reference.

First and second transparent elements 28 and 30 may be any material which is transparent and has sufficient strength to be able to operate in the environmental conditions to which the device will be exposed. Elements 28 and 30 may comprise any type of borosilicate glass, soda lime glass, float glass, or any other material, such as, for example, MYLAR®, polyvinylidene chloride, polyvinylidene halides, such as polyvinylidene fluoride, a polymer or plastic, such as cyclic olefin copolymers like Topas® available from Ticona, LLC of Summit, N.J., that is transparent in the visible region of the electromagnetic spectrum. Elements 28 and 30 are preferably made from sheets of glass.

Additionally, substrates 12 and 14 may be treated or coated as is described in U.S. Pat. No. 6,239,898 entitled "ELECTROCHROMIC STRUCTURES," U.S. Pat. No. 6,193,378 entitled "AN ELECTROCHROMIC DEVICE HAVING A SELF-CLEANING HYDROPHILIC COATING," and U.S. Pat. No. 6,816,297 entitled "AN ELECTRO-OPTIC DEVICE HAVING A SELF-CLEANING HYDROPHILIC COATING," filed on Jun. 23, 2000, the entire disclosures of which are incorporated herein by reference. Other treatments, such as anti-reflectance coatings, hydrophilic coatings, low-E coatings, and UV-blocking layers are also envisioned. Also, such coatings may be applied to elements 28 and 30 in this and other embodiments.

Transparent electrodes 32 and 34 may be made of any material which bonds well to transparent elements 28 and 30, is resistant to corrosion to any materials within the electrochromic device, resistant to corrosion by the atmosphere, has minimal diffuse or specular reflectance, high light transmission, near neutral coloration, and good electrical conductance. Transparent electrodes 32 and 34 may be fluorine-doped tin oxide, doped zinc oxide, zinc-doped indium oxide, tin-doped indium oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey-Owens-Ford Co. of Toledo, Ohio, or other transparent conductors. Generally, the conductance of transparent electrodes 32 and 34 will depend on their thickness and composition. IMI generally has superior conductivity compared with the other materials. IMI, however, is known to undergo more rapid environmental degradation and suffer from interlayer delamination. The thickness of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material may be deposited between transparent electrodes 32 and 34 and the inner surface of element 28 to suppress the transmission of any unwanted portions of the electromagnetic spectrum.

In the particular embodiment shown in FIG. 1A, seal 36 may be any material that is capable of adhesively bonding to the coatings on the inner surfaces of transparent elements 28 and 30 to seal the perimeter, such that electrochromic material 38 does not leak from the chamber defined between the transparent substrates. The seal preferably has good adhesion to glass, metals, and metal oxides; preferably has low permeabilities for oxygen, moisture vapor, and other detrimental vapors and gasses; and must not interact with or poison the electrochromic material it is meant to contain and protect. The seal may be applied in any conventional manner. A preferred seal material and method for applying the seal as well as a preferred method of constructing electrochromic device 22 are described further below.

As illustrated in FIG. 1A, electrochromic device 22 further includes a pair of electrical bus clips 40a and 40b that are respectively clipped about the perimeter of first and second transparent elements 28 and 30 in such a manner as to physically and electrically contact transparent electrodes 32 and 34. Bus clips 40a and 40b thus enable electrical current to flow between an external driving circuit through first and second transparent electrodes 32 and 34 and the electrochromic medium 38 contained in the chamber therebetween. In this manner, the light transmittance of electrochromic device 22 may be varied in response to electrical control of an external drive circuit. Bus clips 40a and 40b may be made of any known construction and known materials. One possible construction for bus clips 40a and 40b is disclosed in U.S. Pat. No. 6,064,509 entitled "CLIP FOR USE WITH TRANSPARENT CONDUCTIVE ELECTRODES IN ELECTROCHROMIC DEVICES" filed on Aug. 22, 1997, by Tonar et al., the disclosure of which is incorporated herein by reference. Preferred constructions for bus clips 40a and 40b, as well as preferred materials for the bus clips, are described further below.

Other novel configurations for bus clips would include the use of two bus clips that were held together by an insulating, non-conductive material such as a plastic or rubber. This arrangement would allow the bus clips to be attached to both opposing glass elements 28 and 30 in one step without allowing them to short each other out electrically. See FIG. 6H.

Again, bus clips are used as a means of uniformly transferring electricity from lead wires to the conductive coating that has been previously deposited on the glass elements. This can also be accomplished by the use of a metal-doped paint or coating (such as silver, copper, etc.), or by the use of conductive adhesive tapes, such as those available from the 3M Corporation. Examples of these tapes are 3M's Electrically Conductive Adhesive Transfer Tape #9703 and #9713. Additionally, metal foil or exposed wire may be used.

As illustrated in FIG. 1A, a second seal in the form of a sealant 42 is applied within any gaps that may exist between the perimeter of electrochromic device 22 and groove 20. As described further below, sealant 42 may be an epoxy or the like that can readily flow within the small void areas surrounding clips 40 within groove 20.

A third seal in the form of a sealant 44 is also provided between spacer 18 and first and second substrates 12 and 14 and frame 16. Sealant 44 is provided to ensure that the chambers 24 and 26 between substrates 12 and 14 are airtight such that any gasses that may be contained in chambers 24 and 26 may not leak out from between substrates 12 and 14. Sealant 44 further serves as a moisture barrier for preventing moisture from the environment surrounding the window from reaching the chambers between substrates 12 and 14.

The sealants 18, 42, and 44 may be a hot melt rubber compound, such as a hot melt butyl, a silicone, a urethane, a polysulfide, or the like. Additionally, the sealants 18, 42, and 44 may be modified for aesthetic, chemical, or physical properties by the use of various additives. These additives may include, but are not limited to, anti-oxidants, pigments, rheology modifiers, fibers, glass and synthetic spheres, and the like.

The window assembly 10 shown in FIG. 1A may include one or more layers 46 applied to one of the surfaces of substrate 12, substrate 14, and/or either surface of electrochromic device 22. Such layers may include a low-emission (low-E) layer or stack, a heat mirror, an ultraviolet (UV) filter of blocking layer, and a near infrared (NIR) blocking layer or filter.

The placement of the layer 46 will vary, depending on the function it is to perform. If a UV filter is used, it would be disposed on surface 12a, 12b, or 22a in order to block UV radiation from reaching electrochromic device 22. If the UV filter is placed on surface 12a, protection in the form of a hard coat would also be provided. Since the electrochromic device would absorb a significant amount of solar radiation, the placement of the low-E coating would be somewhat different than commonly used in insolated glass units (IGUs) currently available. The electrochromic device 22 in its darkened state in sunlight would become the portion of the window that has the highest temperature; therefore, any low-E coatings would be most useful inside of the electrochromic device 22 to reject heat during the summer months. The low-E coating would be disposed on surfaces 22b, 14a, or 14b, with 22b giving the best rejection of heat from the outside, again if surface 14b is coated with a low-E coating, an additional hardcoat could also be provided. The NIR filter, if it absorbs NIR radiation, would be heated by sunlight and for heat rejection would preferably be placed on one of the surfaces of substrate 12 or on surface 22a. Additionally, if the low-E coating were disposed on substrate 14, an NIR absorbing filter could be placed on surface 22b.

Figure 1B:
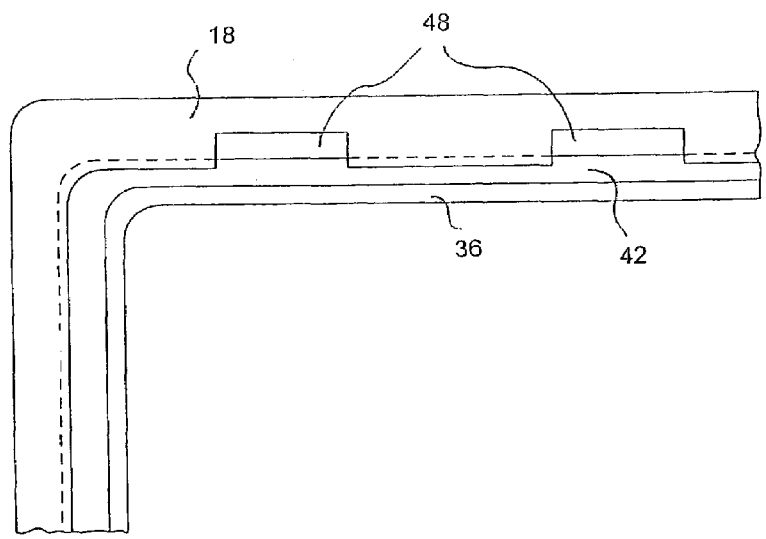
FIG. 1B is a side view of a portion of the electrochromic window shown in FIG. 1A.

As illustrated in FIGS. 1A and 1B, window assembly 10 may further include one or more channels 48 formed in spacer 18 that extend from one side of electrochromic device 22 to the other side and thereby allow airflow between first chamber 24 and second chamber 26. By allowing such airflow between the chambers, the affects of wind loading on device 22 may be reduced. Such wind loading causes substrate 12 to bow inward, causes the gas contained in an airtight chamber 24 to compress, and thereby causes electrochromic device 22 to also be affected by wind loading. Channel(s) 48 equalize the pressures on either side of electrochromic device 22 and thereby reduce any flexing of the transparent substrates or other components of electrochromic device 22 as a result of wind loading. Such air passage between chambers 24 and 26 also would reduce temperature loading that may otherwise occur, which would again cause an increase of pressure in the gas in the first chamber 24 without otherwise producing an equal increasing pressure in second chamber 26. Clearly, if different gasses are maintained in chambers 24 and 26, one would not utilize channel(s) 48.

As shown in FIG. 1A, first seal 36 is protected from the environment outside of the window by second seal 42, spacer 18, third seal 44, and frame 16. The sealant used to form third seal 44 is preferably highly resistant to air and moisture such that the space between substrates 12 and 14 is completely airtight. When chambers 24 and 26 are filled with an inert gas such as argon, the material selected for first seal 36 and second seal 42 need not be oxygen impermeable or even moisture impermeable. Nevertheless, first seal 36 must not interact with or poison the electrochromic medium 38. By removing the requirements that first seal 36 need be oxygen and moisture impermeable, seal 36 may be constructed using materials not currently used in the construction of electrochromic devices. That is, since the inner most ("primary") seal essentially need only contain the electrochromic fluid or gel, whereas the secondary seal is more importantly an oxygen and moisture vapor barrier, the material out of which the inner most seal is constructed can be selected from a wide range of materials. This allows the primary seal to be made out of less expensive materials. These materials can be polyisoprene, polyisobutylene, polychloroprene, ethylene propylene diene methylene rubbers, polyetheylenes, fluorocarbon rubbers, silicone rubbers, epoxies, polyurethanes, nitrites, butyl rubber, neoprene, Teflon® (tetrafluoroethylene fluorocarbon, fluorinated ethylene-propylene, or copolymers thereof), and the like. Additionally, these materials may be modified with different additives to affect the chemical, physical, or their aesthetic appearance. For example, black pigments could be used to produce a dark sealant, and fumed silica could be used to increase thixotropy or adjust the CTE, such as described in U.S. Pat. No. 6,157,480, filed on Sep. 21, 1998, the entire disclosure of which is incorporated herein by reference.

The epoxy seals currently used in constructing electrochromic mirrors are often thermally cured epoxies. Because electrochromic windows are much larger than the rearview mirror, the thermal energy that would be required to thermally cure the epoxy would be extremely large. Also, the epoxy seals previously used are relatively brittle after curing. Additionally, while such an epoxy works well for smaller electrochromic devices, such as electrochromic rearview mirrors for automobiles, when such an epoxy is used for larger scale electrochromic devices such as windows, there is great difficulty in maintaining the two transparent elements 28 and 30 in a parallel spaced-apart relation throughout the entire surface area of the electrochromic device, particularly when the epoxy is not firm enough to maintain the spacing until it has time to cure. Because seal 36 is sufficiently protected from the external environment and would only be exposed to the electrochromic medium 38 and an inert gas between substrates 12 and 14, first seal 36 may be made of a material that need not be cured, such as a butyl rubber, silicone, EPDM, polyisobutylene, Teflon, neoprene, viton, or the like. Thus, first seal 36 may serve as a spacer both during and after the manufacture of the electrochromic device. Because seal 36 may be made with a stable material, the manner in which such an electrochromic device is manufactured may be advantageously modified as discussed further below and thereby provide for a much simpler and inexpensive method of manufacture that further facilitates mass-production of such large-scale electrochromic devices.

FIG. 2A shows an electrochromic window assembly 100 constructed in accordance with a second embodiment of the present invention. As will be apparent to those skilled in the art, the second embodiment is similar to the first embodiment with the exception that electrochromic device 22 is disposed between two separate spacers 118a and 118b. Such a construction still allows for the provision of the electrochromic device 22 within an airtight chamber between substrates 12 and 14. One advantage to this construction is that it allows for the seal and spacer region around the periphery of the window unit to have a lower profile than in the construction shown in FIG. 1A. FIG. 2B shows a modified version of the second embodiment wherein spacers 118*a* and 118*b* are replaced with a single spacer 18 and wherein the bottom edges of spacer 18 are tapered so as to hide seal 36.

Figure 3A:
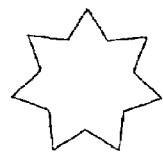
FIG. 3A is a cross-sectional view of a portion of an electrochromic window constructed in accordance with a third embodiment of the present invention.
Figure 3A:
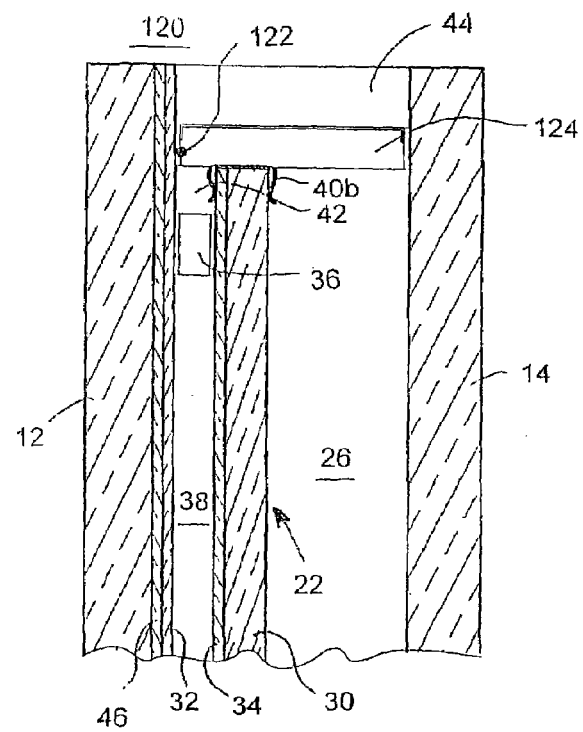

FIG. 3A shows an electrochromic window construction 120 according to a third embodiment of the present invention. Window 120 differs from the windows of the previous embodiments in that the electrochromic device is formed adjacent first substrate 12 with no chamber formed therebetween. Nevertheless, a chamber is still provided between electrochromic device 22 and the inside second substrate 14 that may be an airtight chamber filled with an insulating gas such as argon or the like. Window construction 120 further may differ from the prior embodiments by eliminating first transparent element 28 and instead applying first transparent electrode 32 on a surface of first transparent substrate 12. By eliminating transparent element 28 and by positioning the electrochromic medium 38 closer to external substrate 12, the window assembly is not only lighter and less complex, but the heat rejection of this construction is enhanced. If preassembly of the electrochromic device 22 is desired, a thin transparent sheet of glass, Mylar, or another plastic material may be used as a first transparent element 28 and subsequently adhered to the surface of transparent substrate 12. Such a thin transparent sheet could also be used for element 30. The layer 46 in this embodiment would have similar placement with surfaces 12*b* and 22*a* acting as if they had been merged into a single surface.

Figure 3B:
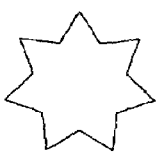
FIG. 3B is a cross-sectional view of a portion of a modified version of the electrochromic window shown in FIG. 3A.
Figure 3B:
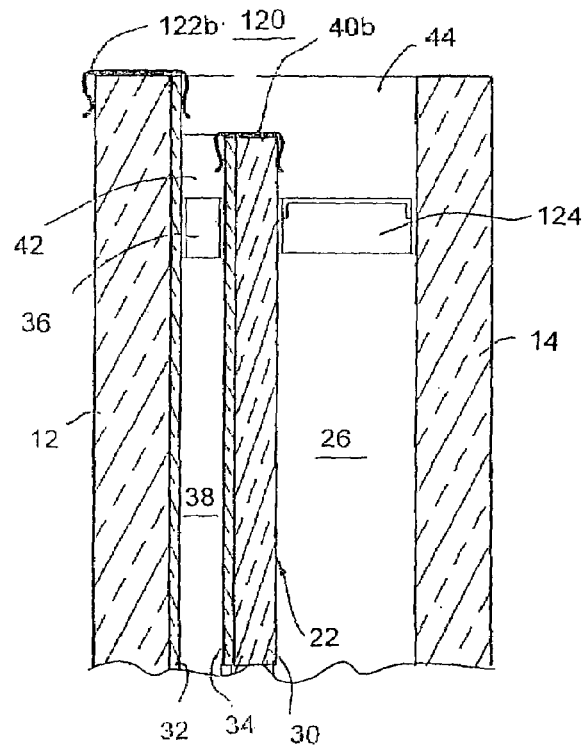
Figure 7:
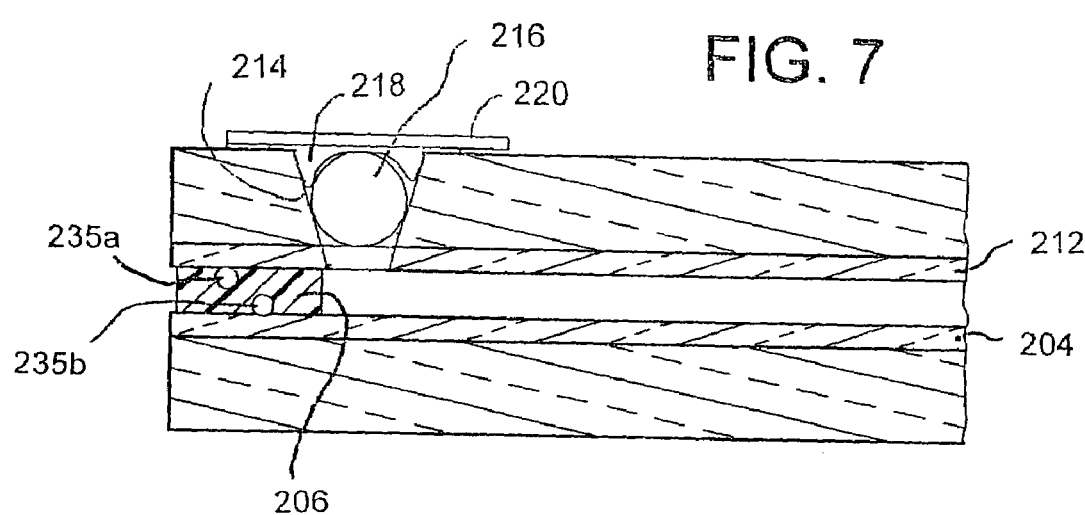
FIG. 7 is a cross-sectional view of a portion of an electrochromic device constructed in accordance with another embodiment of the present invention.
Figure 8:
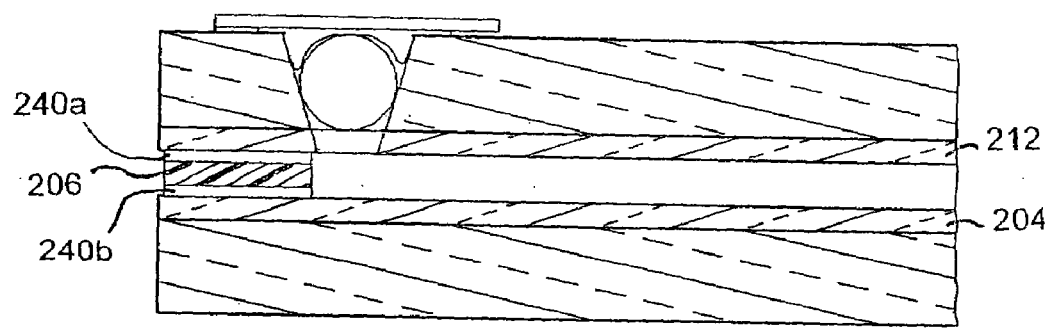
FIG. 8 is a cross-sectional view of a portion of an electrochromic device constructed in accordance with yet another embodiment of the present invention.

To make electrical connection with the two transparent electrodes 32 and 34, an electrically conductive bus clip 40*b* may be utilized to contact second transparent electrode 34 while electrical contact may be made with first transparent electrode 32 by means of an electrical conductor 122 in the form of an exposed wire or metal foil. Conductor 122 may be pressed against first transparent electrode 32 outside of first seal 36 and then covered with the insulated glass unit spacer 124. Alternatively, as shown in FIGS. 7 and 8, the electrical conductor may be disposed between first seal 36 and transparent electrode 32. Further still, as shown in FIG. 3B, transparent electrode 32 may extend up beyond third seal 44 where contact is made with a conductive clip 122*b* on the outside of the airtight chamber formed between substrates 12 and 14.

As illustrated in FIG. 3A, seal 36 is still advantageously maintained within the airtight chamber between substrates 12 and 14 that is formed by spacer 124 and seal 44. Accordingly, seal 36 may be made with materials that facilitate simple and inexpensive manufacture of the electrochromic device. Again, material requirements are much less due to seal 44.

Figure 4A:
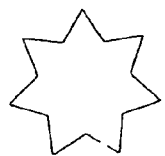
FIG. 4A is a cross-sectional view of a portion of an electrochromic window constructed in accordance with a fourth embodiment of the present invention.
Figure 4A:
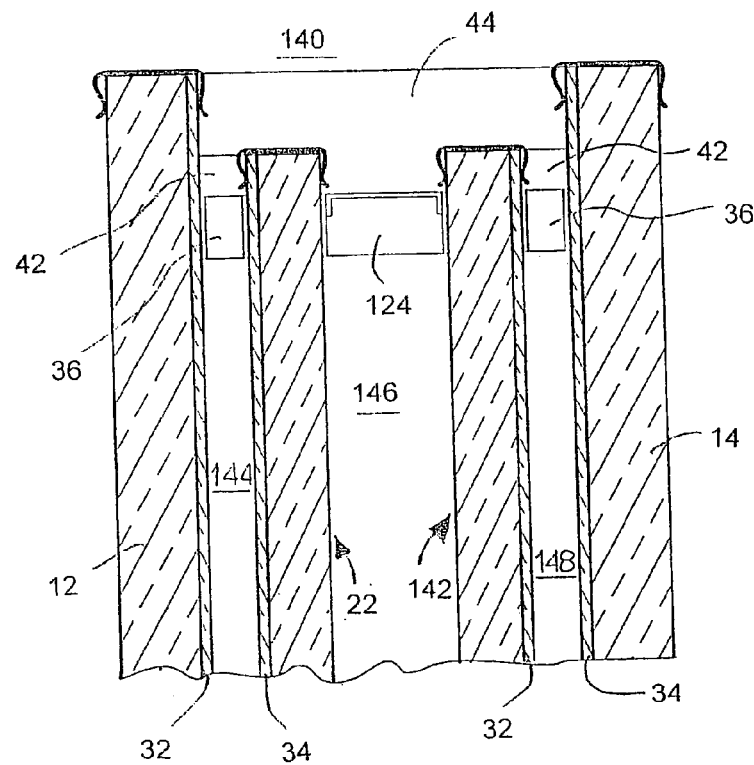

FIG. 4A shows an electrochromic window assembly 140 constructed in accordance with a fourth embodiment of the present invention. The embodiment shown in FIG. 4A differs from the prior embodiments in that one or more additional electrooptic device(s) 142 is/are provided within the airtight chamber defined between substrates 12 and 14. First electrochromic device 22 is preferably positioned as close as possible or on the inward-facing surface 12*b* of first substrate 12 while second electrooptic device 142, which may be another electrochromic device, or a polymer dispersed liquid crystal or suspended particle device (SPD), is positioned closer to the second substrate 14. If devices 22 and 142 are to be formed on the respective surfaces 12*b* and 14*a* of substrates 12 and 14, then the construction of FIGS. 3A and 3B may be utilized in tandem for the construction shown in FIGS. 4A and 4B. On the other hand, if one or more of the devices 22, 142 are spaced apart slightly from the respective substrates 12 and 14 so as to define respective chambers 144 and 148, gasses having a high thermal conductivity may be contained within chambers 144 and 148 so as to facilitate the transfer of heat from the electrochromic devices to the outside of the inner window chamber 146. Chamber 146 would then preferably be filled with an inert insulating gas such as argon. Chamber 146 may also be filled with an inert solvent or a free-standing gel.

For some window applications, it may be desirable to combine the features of electrochromic technology with another technology such as Polymer Dispersed Liquid Crystal (PDLC) technology. The electrochromic systems typically used for windows are good for attenuating light (and heat) transmission, but the transition times between the high and low transmission states are typically measured in minutes not seconds. The transmitted image in the low transmission state is typically clear and free of haze and distortion. These are great attributes for a window system except if complete privacy is desired. A PDLC window system changes from a relatively clear transmissive state to a light scattering cloudy or opaque state. The transmission times from clear to opaque are measured in seconds not minutes. If privacy is desired, the attributes of a PDLC may be preferred, but since the PDLC window just scatters light in the opaque state, it is very poor at attenuating the total amount of light (and heat) that is transmitted through the window. If privacy and light and heat attenuation is desired, it is preferred to combine the two technologies. A PDLC film constructed in a conventional manner could be laminated to an electrochromic window device or the devices could share a substrate in a three-substrate device (substrate/electrochromic layer/substrate/PDLC layer/substrate). The PDLC and electrochromic layers could be operated separately or simultaneously. The PDLC layer could be oriented in front of the electrochromic layer such that it first scatters the direct sunlight which is then absorbed by the electrochromic layer or the electrochromic layer could be oriented first. The PDLC layer may contain a UV absorber to protect the electrochromic layer if it is oriented closer to substrate 12.

By providing a second electrochromic or electrooptic device closer to the inside substrate 14 of window assembly 140, heat from the incident solar energy may be transmitted to the inside of the house rather than the outside of the house during winter months and colder days whereas heat can be rejected by utilizing electrochromic device 22 during the summer months and warmer days. Optionally, the two devices can attenuate different wavelengths of light, for example, visible and NIR. Further, one of the two devices 22 and 142 could be used at any one time. Nevertheless, it would also be possible to simultaneously activate both devices 22 and 142, particularly during summer months, to provide additional absorption of solar light that would otherwise be transmitted through the structure. Such simultaneous activation may also be desired at nighttime for purposes of added privacy. The placement of the layer 46 in this embodiment will be somewhat different than has been discussed previously. If a UV filter or NIR absorbing layer is used, it again would be disposed on surface 12*a*, 12*b*, or 22*a* in order to block radiation. The placement of the low-E coating would be somewhat different than in the previous discussion since the construction of FIG. 4A is designed to enhance the heat retained inside the building during the winter months and colder days. The low-E coating would be disposed on surfaces 22b or 142a to reject the heat from the outside during the cooling seasons and to retain heat during the heating seasons.

Figure 4B:
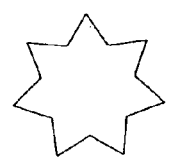
FIG. 4B is a cross-sectional view of a portion of a modified version of the electrochromic window shown in FIG. 4A.
Figure 4B:
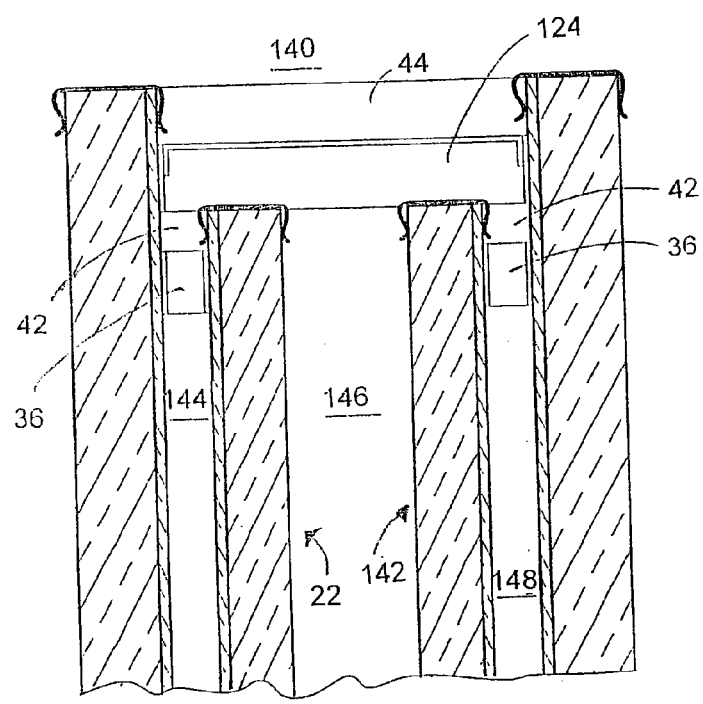
Figure 5:
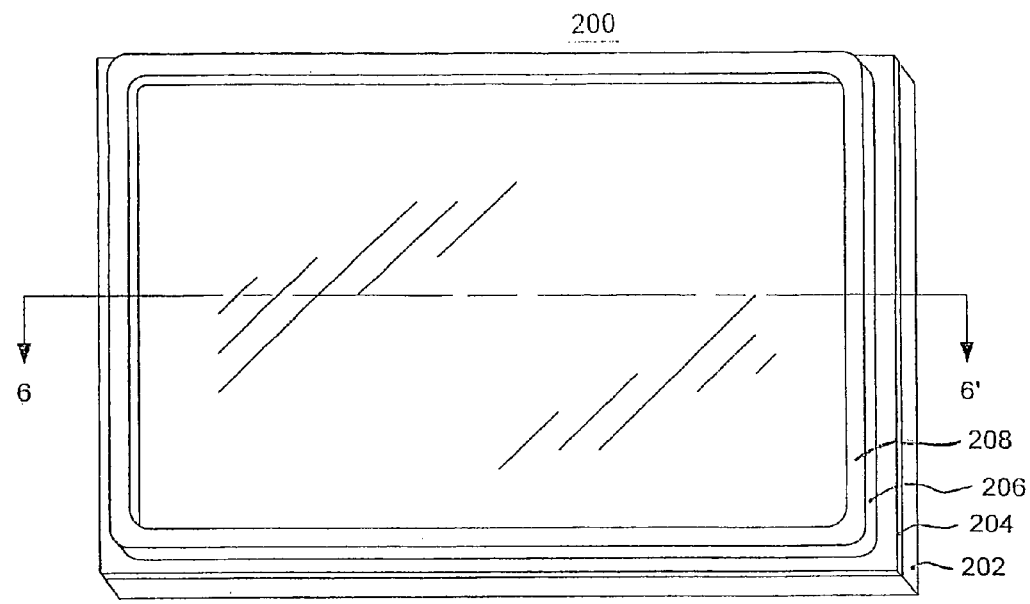
FIG. 5 is a perspective view of a first subassembly used to construct an electrochromic device in accordance with one embodiment of the present invention.

FIG. 4B shows a variation of the spacer construction for a dual-element window in which spacer 124 extends across the tops of elements 22 and 142 rather than in between elements 22 and 142, as in the construction shown in FIG. 4A.

As discussed above, a benefit of maintaining the electrochromic device within the airtight chamber of the insulated glass unit is that a first seal 36 (206 in FIGS. 5 and 6A–6I) need not be highly impermeable to oxygen and moisture, and need not be further cured after original manufacture of the electrochromic device. An example of a preferred material is EPDM, which may be pre-formed as a gasket that is subsequently adhered to the surface of a transparent substrate 202 (see FIGS. 5 and 6A). Transparent substrate 202 is coated with a transparent electrode 204. In addition, an adhesive may be applied in advance to the opposite surface of seal 206 and a release liner 208 may be applied to the adhesive such that the subassembly 200 shown in FIG. 5 may be preassembled and stored in inventory. Previously, such a preassembled subassembly for an electrochromic device could not be constructed due to the materials that were required to be used for the seal.

It should be noted that the drawings discussed above and below are not to scale, but have exaggerated dimensions in some respects, particularly in their thicknesses, to illustrate the principles of the invention. It should be understood that certain aspects of the invention may be applied to smaller electrochromic devices, such as electrochromic rearview mirrors.

Figure 6A:
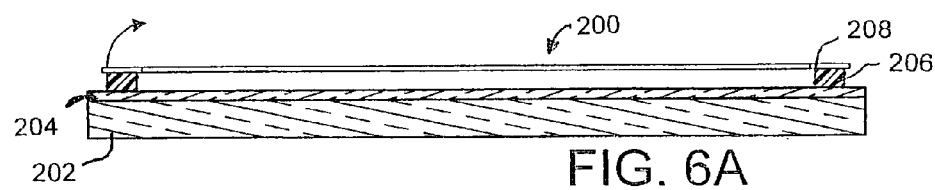
FIG. 6A is a cross-sectional view of the first subassembly shown in FIG. 5 taken along line 6—6'.

The inventive method for constructing an electrochromic device of the type that may be implemented in a large electrochromic window assembly is discussed below with reference to FIGS. 6A–6I. As illustrated in FIG. 6A, a subassembly 200 (see also FIG. 5) is constructed whereby a seal gasket 206 is adhesively attached or bonded to the surface of a transparent electrode layer 204 that is formed on a transparent substrate 202. Transparent glass substrates having a preapplied layer of a transparent electrode are commercially available, such as TEC-15 glass from Libbey-Owens-Ford. As illustrated in FIG. 6A, a release liner 208, such as polyethylene or siliconized polyester or the like, may be applied to the opposite surface of seal gasket 206. Release liner 208 could be secured to seal gasket 206 by the same adhesive that would subsequently be used to secure a second transparent substrate 210 having a transparent electrode layer 212 formed thereon (see FIG. 6B).

Conceivably, seal gasket 206 could be preconstructed to have adhesive applied to its two opposite surfaces and release liners may be applied to both surfaces of seal gasket 206. This would allow the seal gaskets by themselves to be separately stored, then selected and readily applied onto one of the coated substrates 202 or 210. Because seal gasket 206 has sufficient resistance to compression to maintain cell spacing while extending around substantially the entire periphery of the transparent substrates, seal gasket 206 functions as a spacer both during and after the manufacturing process.

Figure 6B:
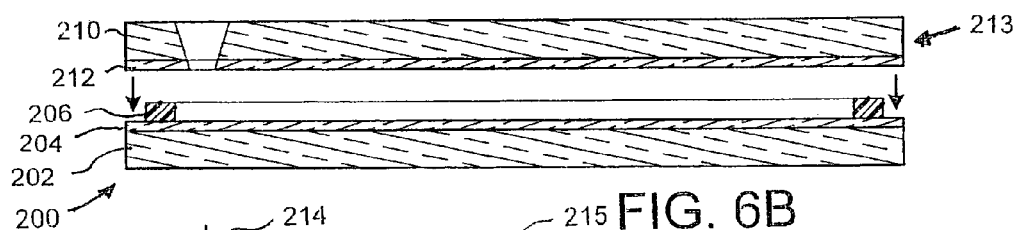
FIG. 6B is a cross-sectional view showing a second step in the inventive method for assembling an electrochromic device.

As shown in FIG. 6B, once release liner 208 has been removed from seal gasket 206, a second subassembly 213 including a second transparent substrate 210, having one surface coated with a transparent electrically conductive material 212, may be aligned with transparent substrate 202 and pressed into contact with the adhesive on seal gasket 206. This operation may be performed with substrates 210 and 202 disposed in either horizontal planes or vertical planes. An apparatus such as a vacuum chuck or the like may be used to move substrates 212 and 202 together. Once coated substrates 202 and 210 are pressed into contact via seal gasket 206, a secondary seal may be applied and the chamber defined between coated substrates 202 and 210 and seal gasket 206 may be filled with an electrochromic medium 215. Preferably, the electrochromic medium contains a gelling agent that will form a cross-linked polymer matrix between coated substrates 202 and 210. Substrates 202 and 210 may be held in place by the vacuum chuck that first holds the substrates in a fixed position until the chamber is filled with the electrochromic medium. Once the matrix has been formed, the assembly will exhibit sufficient structural integrity such that one of the substrates will not bow towards the other substrate in a middle portion of the device and the spacing between the substrates will be maintained uniform throughout the device.

Additionally, the first seal may be dispensed and include various rheology modifiers to adjust the flow characteristics of the dispensed material. Other additives could be used to affect other chemical, physical, or aesthetic properties. To maintain the desired cell spacing when a dispensed material is employed, the spaced-apart relationship of the substrates 28 and 30 could be maintained by the use of certain spacers consisting of, for example, glass spheres, synthetic spheres, rubber blocks, and the like.

Figure 6C:
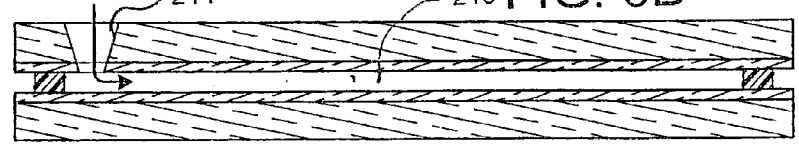
FIG. 6C is a cross-sectional view showing a third step in the inventive method for assembling an electrochromic device.
Figure 6D:
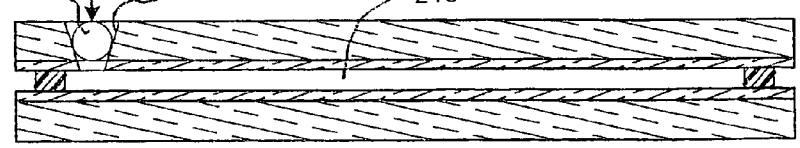
FIG. 6D is a cross-sectional view showing a fourth step in the inventive method for assembling an electrochromic device.

As shown in FIG. 6C, coated substrate 210 preferably includes a fill hole 214 into which the electrochromic material is introduced. An additional aperture (not shown) may also be formed to enable a vacuum to be attached and hence to allow vacuum enhanced filling of the chamber between the two substrates. The fill hole 214 is preferably conically shaped with the larger opening disposed at the exterior of the device. The conical hole is formed by drilling partially from each side of the glass lite to avoid the uneven breakthrough and shattering seen when such a hole is drilled from one side only. After the introduction of electrochromic material into the device, the fill hole(s) is plugged (sealed) with some type of material that will not adversely affect the electrochromic material. This material may be a polymeric material such as polyisobutylene, polyolefin, butylnitrile, and the like. Alternatively, this material may be a pliable or rigid sphere or spheroid whose size is selected to fit within the conical hole without dropping into the space formed by the two spaced-apart glass elements. This sphere or spheroid may be made of glass, Teflon® (tetrafluoroethylene fluorocarbon, fluorinated ethylene-propylene, or copolymers thereof), or the like. Preferably, the sphere is a Teflon® ball obtained from Small Parts Inc. The material utilized as the conical hole sealant may also be held in place by an adhesive material. This material may be a pressure sensitive adhesive or a UV curable material, preferably Dymax 20014. A glass or plastic slide may also be superimposed upon the adhesive as an additional sealing material. In the case of a UV curable adhesive, the slide is positioned over the plugged conical hole prior to the curing of the adhesive.

During filling, the structure shown in FIG. 6C may be rotated from a vertical orientation with fill hole 214 at the top portion of the structure so as to use gravity to aid filling to a horizontal position. Rotation about another axis simultaneously is also possible. This prevents air bubbles from getting trapped in the chamber. By forming fill hole 214 in a conical shape, a ball 216 may subsequently be inserted into fill hole 214 after filling has been completed (see FIG. 6D). The chosen shape of fill hole 214 serves to prevent plug 216 from falling through substrate 210 into chamber 215 and allows for the plug to have a pre-formed shape, such as spherical, conical, etc. Again, the dimensions of fill hole 214 and ball 216 relative to the electrochromic device structure shown in the figures is exaggerated for purposes of illustration. In general, fill hole 214 and ball 216 would be extremely small when compared to the entire surface area of the electrochromic device.

Fill hole 214 is preferably formed near the perimeter of the electrochromic device in an area just lying inside of the sealed area of the chamber. In this manner, the fill hole and plug will not be highly visible to someone looking through the window and may be obscured by the frame or spacer used to hold the electrochromic device within the window structure.

Figure 6E:
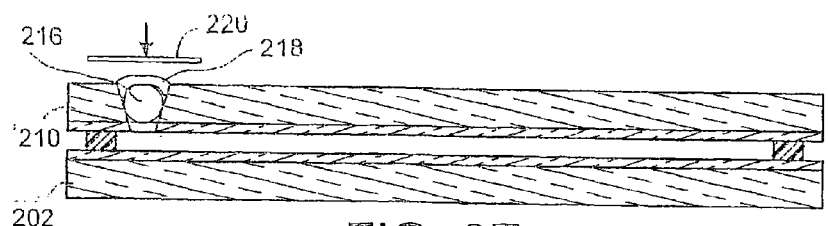
FIG. 6E is a cross-sectional view showing a fifth step in the inventive method for assembling an electrochromic device.
Figure 6F:
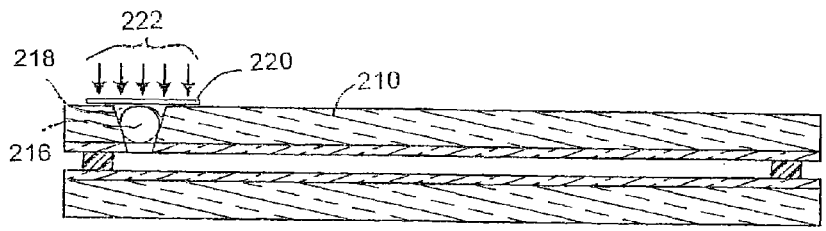
FIG. 6F is a cross-sectional view showing a sixth step in the inventive method for assembling an electrochromic device.

Plug 216 is preferably made of a material that will not poison or interact with the electrochromic medium contained in chamber 215. More specifically, plug 216 is preferably spherical in shape and made of materials such that when the plug is inserted in hole 214, it snuggly fits within fill hole 214. Plug 216 may be made of polyethylene, Teflon®, stainless steel, gold, glass, ceramic, polypropylene, polyamide, PIB, butyl rubber or EPDM. As shown in FIG. 6E, after plug 216 has been inserted into fill hole 214, an adhesive 218 is applied to the top of plug 216 so as to slightly overfill fill hole 214. Preferably, UV curable adhesive is Dymax 20014. By utilizing a plug 216 or any other similar structure that could fill a fill hole of virtually the same shape in a similar manner, adhesive 218 is prevented from coming into contact with the electrochromic material disposed within chamber 215. This is important, since many of the adhesives interact with, or otherwise poison, electrochromic materials that are commonly used for electrochromic devices. Subsequently, a thin transparent member 220 is pressed down onto adhesive 218 until it essentially lies flat on the outer surface of coated substrate 210 as illustrated in FIG. 6F. Member 220 is preferably made of a material that is transparent to UV radiation and that is also impermeable to oxygen. Member 220 may be made of Mylar or a glass microscope slide slip cover. Member 220 is preferably dimensioned to be sufficiently larger than the opening of fill hole 214 so as to increase the path that oxygen or moisture would need to travel to enter the device through fill hole 214.

Then, as illustrated in FIG. 6F, UV radiation 222 is directed onto and through member 220 so as to cure adhesive 218. Once adhesive 218 has cured, a very strong plug for fill hole 214 is created without utilizing any highly visible plug for the fill hole.

Figure 6G:
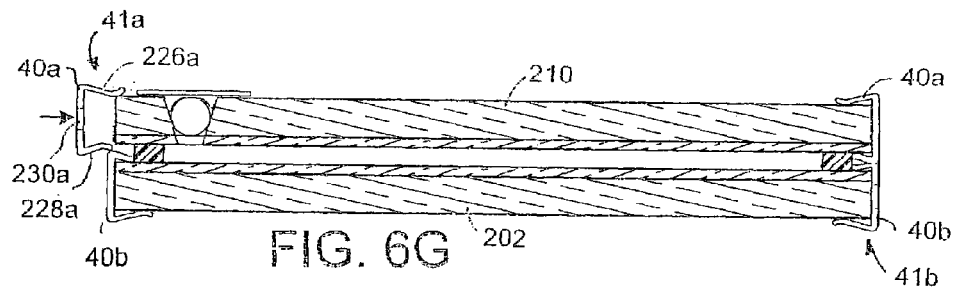
FIG. 6G is a cross-sectional view showing a seventh step in the inventive method for assembling an electrochromic device.

FIG. 6G shows the next step in the process, which is to apply bus clips 40a and 40b to coated substrates 210 and 202. Such clips are generally friction fit around the perimeter of the electrochromic device.

In prior constructions, particularly in electrochromic devices used as rearview mirrors, two separate bus clips were typically applied along opposite edges of the electrochromic device so as to avoid inadvertent contact and electrical shorting between the bus clips. Thus, for example, prior electrochromic devices would include bus clips positioned such as in location 41a and 41b shown in FIG. 6G with substrates 210 and 202 offset from each other. Furthermore, such bus clips would only extend along a top or bottom edge of the electrochromic device, since the distance through which the current would flow was not excessively great. With larger scale electrochromic devices such as those used in windows, the distance between the bus clips and the opposite edge of the corresponding transparent electrode tends to cause non-uniform current flow through the transparent electrodes. Such non-uniform current flow causes non-uniform coloration of the electrochromic material, which can be aesthetically undesirable.

Previously, bus clips were conventionally formed of a metal strip or spine with a plurality of resilient fingers extending transversely from the spine. As an example, with reference to FIG. 6H, conventional bus clips included a spine 230a and a plurality of spaced-apart resilient fingers 226a and 228a that extend transversely from the spine. As shown in FIG. 6G, such clips would have fingers that are tapered slightly inward so as to clamp onto the outer periphery of the coated substrates. In general, in conventional bus clips, fingers 226a and 228a had widths that were much greater than the spacings between each of the fingers. Thus, the fingers extending from a conventional spine 230a had the same appearance on both sides thereof as fingers 226a shown in FIG. 6H. The inventive bus clips, on the other hand, differ from the conventional bus clips insofar as every other finger on at least one of the sides of the bus clip is removed or otherwise not provided so as to allow a bus clip on the other substrate to be applied along the same edges without making physical or electrical contact with the fingers of the other bus clip. Thus, the fingers have widths that are less than the spacing therebetween to allow the fingers of the two bus clips 40a and 40b to be effectively intermeshed at least in those regions where the fingers of opposing bus clips extend towards one another.

Figure 10A:
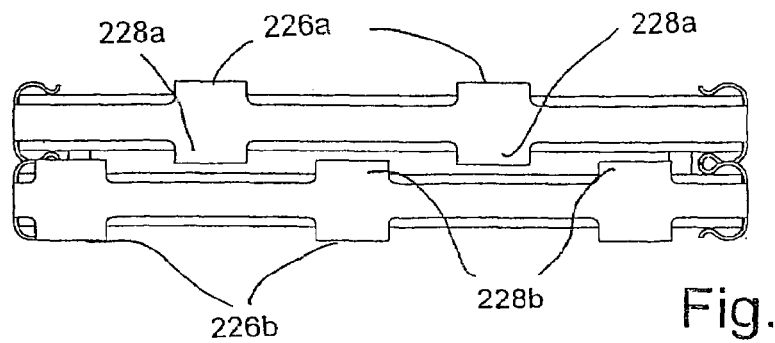
FIG. 10A is a side perspective view of a partially assembled electrochromic device constructed in accordance with the inventive method.
Figure 10B:
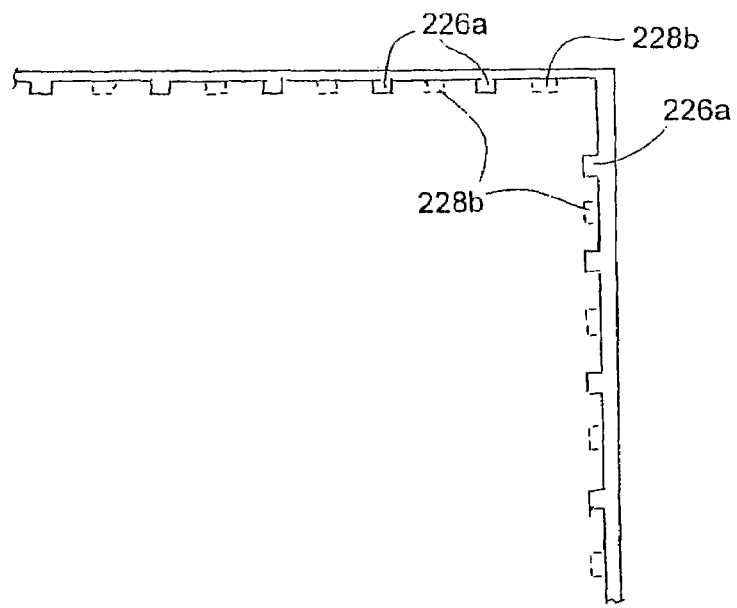
FIG. 10B is a front view of a portion of the device shown in FIG. 10A.
Figure 10C:
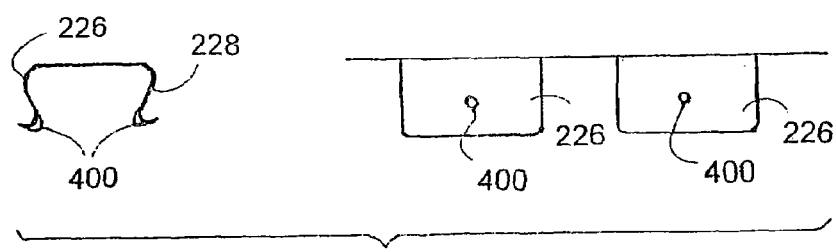
FIG. 10C shows end and side perspective views of a bus clip constructed in accordance with the present invention.

As shown in FIGS. 10A and 10B, the spacing or pitch between fingers 228 should be greater than the width of fingers 228 themselves to allow for bending the bus clip around the corners of the substrates without inadvertent contact that would cause a short. Likewise, the length of the fingers should be selected to also prevent such shorting. As shown in FIG. 10C, fingers 226 and 228 may have dimples 400 so as to provide better electrical contact with the transparent electrodes.

Figure 6H:
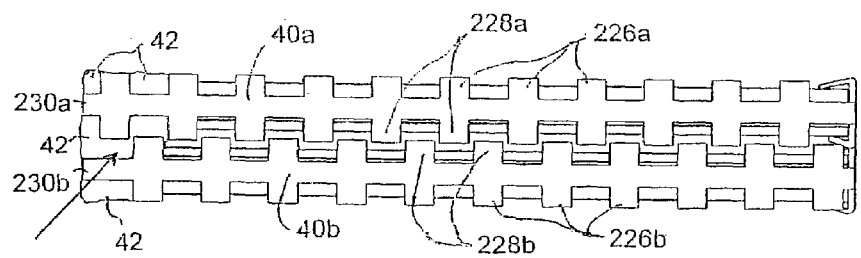
FIG. 6H is a side perspective view of a partially assembled electrochromic device constructed in accordance with the inventive method.
Figure 6I:
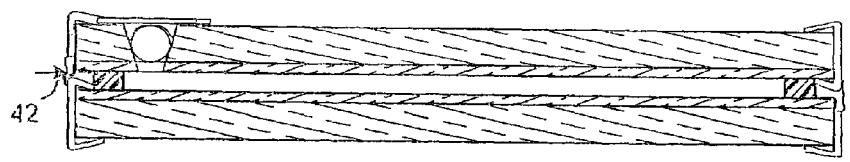
FIG. 6I is a cross-sectional view showing an eighth step in the inventive method for assembling an electrochromic device.

By utilizing the inventive bus clip structure shown in FIGS. 6H, 10A, and 10B, bus clips may be provided about the entire periphery of both coated transparent substrates 210 and 202 without making physical contact with one another. Thus, by enabling bus clips to be provided around the entire periphery of the electrochromic device and hence contact the respective transparent electrodes 204 and 212 about their entire perimeters, the transparent electrodes will show a more uniform current density throughout the surface of the electrochromic device and the electrochromic medium will color more uniformly to its darkened state and be less prone to segregation than prior configurations. To ensure that the bus clips do not slide along the edge of the substrates and come into contact with one another, and to provide a second seal that may have better moisture and oxygen impermeability properties, an epoxy sealant (not shown) may be applied to the outer perimeter of the electrochromic device. This epoxy sealant may be applied prior to filling of the window or it may be applied at the time during which the electrochromic device is secured within a groove of an insulated glass spacer member or between spacer members.

Another advantage of the inventive construction is that bus clips 40a and 40b may be constructed of materials previously not considered suitable for an electrochromic device. In particular, steel or other iron containing elements were not previously considered for use as bus clips due to the fact that such materials will rust as a result of surface oxidation when exposed to oxygen. However, by protecting the entire electrochromic device structure within an airtight chamber between the two substrates of the insulated glass assembly, and by further filling the chambers with inert gas such as argon, bus clips made of steel or the like will not be exposed to oxygen and will thus not rust. Steel clips are preferable to conventional clip materials, since they are roughly one-fifth of the cost. Because it is preferable to extend the bus clips around the entire periphery of the electrochromic device, this cost savings is all the more significant.

FIG. 7 shows an alternative construction for extending electrical conductors in contact with the respective transparent electrodes 204 and 212 about their entire perimeter. Specifically, in FIG. 7, two exposed wires 235a and 235b are pressed into opposite sides of seal gasket 206. The adhesive that is applied to the seal gasket serves to hold the wires in place as the wires are extended around the perimeter of seal gasket 206. This assembly may then be adhered and pressed against the respective transparent electrodes 204 and 212, and thereby provide contact with electrical wires 235a and 235b about the entire perimeter of electrodes 204 and 212. A similar approach shown in FIG. 8 may be taken using conductive foil strips 240a and 240b that may be adhered to opposite sides of seal gasket 206. A conductive adhesive layer could then be applied to the exposed surfaces of the metal foil to adhere to transparent electrodes 204 and 212. The conductive foil strips could be applied on the inside or outside of the transparent elements and also could be applied by vacuum depositing a conductive metal around the perimeter of the device.

It should be noted that while the manufacturing method discussed above is described with respect to electrochromic devices for incorporation into windows, such a method may be applied to electrochromic devices or even other devices providing variable light transmittance. For example, such a method could be used to construct electrochromic rearview mirrors. Further, the inventive fill hole and plugging structure may also be utilized in an electrochromic mirror as may the inventive bus clip construction described above. Further, while specific window assemblies are described above with respect to FIGS. 1–4, the inventive electrochromic device may be incorporated into any other known window structure.

It should also be noted that a photovoltaic power source may additionally be added to the above window structures as disclosed in U.S. Pat. No. 5,805,330. The photovoltaic source may be used to power the electrochromic device.

Figure 9:
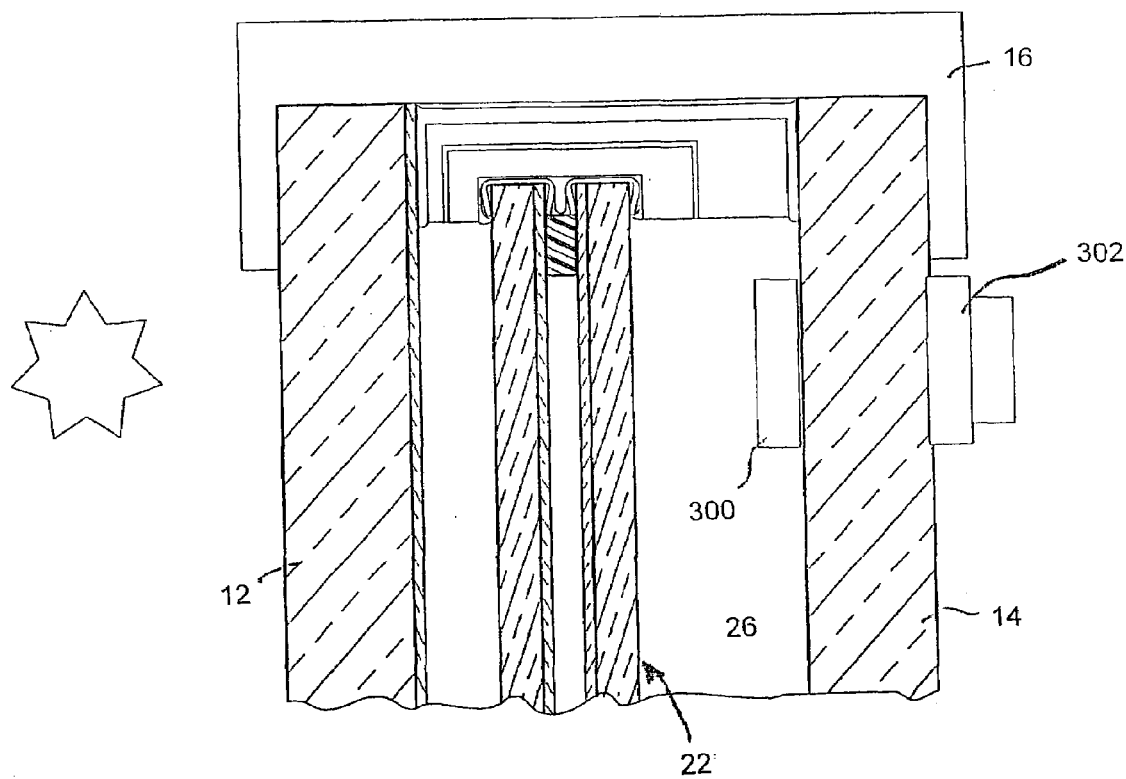
FIG. 9 is a cross-sectional view of a portion of an electrochromic window assembly constructed in accordance with another embodiment of the present invention.

FIG. 9 shows an embodiment of the window assembly that includes a control mechanism for monitoring the light levels transmitted through electrochromic device 22 and for adjusting the voltage level applied to electrochromic device 22 so as to vary its transmittance and thereby maintain a constant level of light in the interior of the building. This system includes a photo sensor 300 that may be a part of a photovoltaic power source that is mounted within chamber 26 behind electrochromic device 22. By mounting photo sensor 300 behind electrochromic device 22, the sensor may sense the light level as attenuated by electrochromic device 22 and thereby adjust its transmittance/absorption characteristics so as to maintain a uniform intensity of light as sensed by the sensor. The circuitry for controlling the voltage applied to electrochromic device 22 may also be incorporated within chamber 26 or otherwise incorporated within the frame/spacer assembly. If photosensor 300 is part of a photovoltaic power supply, then the voltage that is to be supplied to electrochromic device 22 may be generated from within the window assembly itself.

As also shown in FIG. 9, a manual switch mechanism 302 may be supplied on the outside of transparent substrate 14 that allows a person to effectively dial the desired transmittance level. Switch 302 may supply this signal to the circuitry and to photosensor 300 via a magnetic link through glass 14 in a similar manner to which signals are transmitted through automotive glass in cellular telephone antennas. The transmittance level of electrochromic device 22 may also be controlled remotely using a wireless receiver that is contained within chamber 26. The wireless receiver may be an infrared sensing photodiode or the like so as to receive an infrared control signal from a remote transmitter. The receiver may also be a radio frequency receiver. In this manner, the transmittance levels of the windows may be remotely controlled using a remote control transmitter. Also, the transmittance of the windows may be adjusted under control of a microprocessor-based system remote from the windows that may send control signals via an X10-type system through the commercial power lines of the building in which the windows are mounted.

A preferred electrical control system and electrical contacts for coupling the electrochromic window to the electrical control system is disclosed in commonly assigned U.S. Pat. No. 6,567,708, entitled "SYSTEM TO INTERCONNECT, LINK, AND CONTROL VARIABLE TRANSMISSION WINDOWS AND VARIABLE TRANSMISSION WINDOW CONSTRUCTIONS," the entire disclosure of which is incorporated herein by reference.

As noted above, color instability has been a drawback of prior art electrochromic windows. That is, when these windows have been exposed to outdoor weathering conditions, high temperatures, and UV radiation for extended periods of time in both their inactivated and activated states, or cycled, unacceptable changes in the color of these windows have occurred. Additionally, accelerated testing for electrochromic windows to predict the field life of a device in a relatively short period of time has generally used the change in absorbance at a given wavelength, or the percent of white light transmitted as a figure of merit in evaluating electrochromic devices after a series of tests. These values, while being easily measured, may not be related to consumer acceptability, that is, a small change in the absorbance at a chosen wavelength does not give any information about changes at any other wavelength. Also, the use of percent light transmission may be similarly misleading or incomplete as an indication of the acceptability of an electrochromic window. The change in the value of color coordinates as a figure of merit is more useful in evaluating electrochromic windows than the methods previously used. Also, this measured color change is a more sensitive measure of perceived appearance than either percent light transmission or absorbance change at a given wavelength.

In accordance with the present invention, electrochromic devices are disclosed that exhibit superior color stability, in addition, straightforward, relatively short time test methods for evaluating various electrochromic device designs and constructions for suitability are disclosed.

First, an electrochromic device to be evaluated is constructed using the combination of materials, solvents, polymerizing agents, etc. desired. After construction, the light transmitted through an electrochromic device is measured and recorded in the L*a*b* color space. The device is then exposed to simulated sunlight conditions in a weathering chamber for a period of at least 600 to 700 hours while cycling between its high transmittance state and its low transmittance state, being held in its low transmittance state for at least 30 percent of the total exposure time. After the exposure, the color of the transmitted light is again measured and the difference between the color coordinates for both the clear and colored state is calculated. It has been found that devices that have a color change of less than five after this exposure exhibit enhanced color stability when exposed to outdoor weather conditions after prolonged periods greater than two years.

Second, a device after fabrication is cycled while exposed to an elevated temperature of 85° C. for a period of 1000 hours, the color coordinates are also recorded before and after this exposure. In this case also, a color change of five or less is indicative of the capability of similarly constructed devices to withstand prolonged outdoor exposure. The use of ten as an upper limit for the color change in evaluating electrochromic windows may seem arbitrary; however, after evaluation of a number of windows, it is believed that this color change is approximately the limit for customer acceptance for aging of electrochromic windows. That is, if a window were required to be replaced due to breakage, or for some other reason, the replacement window would be similar in appearance to the aged windows. A color change of five or less is believed to be required for broad customer acceptance of the difference between an aged window and a new one. More preferably, a color change of one or less will generally give aged windows whose color is generally indistinguishable from a new window by people with normal color vision.

In the above discussion and the following examples, references are made to the spectral properties of electrochromic windows constructed in accordance with the parameters specified in each of the examples. In discussing colors, it is useful to refer to the Commission Internationale de l'Eclairage's (CIE) 1976 CIELAB Chromaticity Diagram (commonly referred to as the L*a*b* chart). The technology of color is relatively complex, but a fairly comprehensive discussion is given by F. W. Billmeyer and M. Saltzman in *Principles of Color Technology,* 2nd Edition, J. Wiley and Sons Inc. (1981), and the present disclosure, as it relates to color technology and terminology, generally follows that discussion. In the L*a*b* space, L* defines lightness with an L* value of 100 being white and a L* value of 0 being black, a* denotes the red/green value with a positive a* indicating red and a negative a* indicating green, and b* denotes the yellow/blue value with a positive b* indicating yellow and a negative b* indicating blue. Each of the electrochromic media has an absorption spectra at each particular voltage from which the L*a*b* values may be calculated. To calculate a set of color coordinates, such as L*a*b* values, from the spectral transmission or reflectance, two additional items are required. One is the spectral power distribution of the source or illuminant. The present disclosure uses CIE Standard Illuminant $D_{65}$. The second item needed is the spectral response of the observer. The present disclosure uses the 2-degree CIE standard observer. The illuminant/observer combination used is represented as $D_{65}/2$ degree. The value $\Delta E$ is equal to the square root of $(L_f^*-L_i^*)^2+(a_f^*-a_i^*)^2+(b_f^*-b_i^*)^2$ where the "i" subscript denotes the initial values of the color coordinate values and the "f" subscript denotes the color coordinate values after testing, and hence, provides a measure for quantifying color stability. For an electrochromic window color stability, the $\Delta E$ value of the window should be less than 10. Preferably, the $\Delta E$ value is less than 5, and more preferably is less than about 1.

To illustrate the properties and advantages of the present invention, examples are provided below. The following illustrative examples are not intended to limit the scope of the present invention, but to illustrate its application and use. In the examples below, each of the electrochromic windows was constructed in the same conventional manner. Specifically, two pieces of glass coated with a transparent conductive coating (TEC-15 glass from Libbey-Owens-Ford) were held in a spaced-apart relationship with an epoxy seal material containing glass beads with 250 mm diameter. A gap was left in the seal for the introduction of the electrochromic medium into the cell via vacuum backfilling. The gap was plugged with a UV-curable material after backfilling.

Specifically, 2 by 5 windows refer to devices constructed with two pieces of glass each approximately 2 inches by 5 inches coated with a transparent conductive coating (unless otherwise noted TEC-15 glass from Libbey-Owens-Ford) were held in a spaced-apart relationship with a seal material containing spacers, for example, glass beads with a specific diameter. A gap was left in the seal for the introduction of the electrochromic medium into the device via vacuum backfilling. The gap was then plugged.

EXAMPLE 1

Two of the above constructed windows were filled with a solution containing 16 mM dimethyl-4,4'-bipyridinium bis (tetrafluoroborate); 16 mM 5,10-dihydro-5,10-dimethyl phenazine and 30 mM 4'-methyl-2'-hydroxy-phenyl-benzotriazole (Tinuvin P) in propylene carbonate (PC) with 3 wt % polymethyl methacrylate (PMMA). The color coordinates (L*a*b* D65/2') of transmitted light were recorded and the windows were then subjected to 730 hours of high intensity UV light in an Atlas Weather-Ometer with an Xe lamp operating at 0.55 W/m$^2$ at 340 nm (a darkening cycle consisting of operation of the device at 1.2V for 20 sec. and at 0.0V for 40 sec., these times allowed for the devices to undergo darkening to their steady state transmission values and allow the devices to clear completely). The color coordinates were again recorded and the difference ($\Delta E$) for the windows in their high transmission condition was 2.50 and 2.22 for the low transmission condition $\Delta E$ was 4.45 and 4.99.

EXAMPLE 2

Two windows were constructed the same as in Example 1, but were filled with 16 mM bis (2-phenyl ethyl)-4,4'-bipyridinium bis (tetrafloroborate) 16 mM DMP, 30 mM Tinuvin P in PC with 3 wt % PMMA. A similar test as performed to Example 1 was performed except that the windows were measured after 629 hours. These windows exhibited an $\Delta E$ (high transmission) of 1.18 and 1.121 and an $\Delta E$ (low transmission) of 1.09 and 1.33.

EXAMPLE 3

Two windows were constructed having the same structure as in Examples 1 and 2 above except that the windows were filled with 15 mM bis (3-phenyl propyl)-4,4'-bipyridinium bis (tetrafluoroborate), 16 mM DMP 30 mM Tinuvin P in PC with 3 wt % PMMA after 629 hours, which is a conventional electrochromic material. Accordingly, this example served as a control for purposes of comparison with Examples 1 and 2 above. The following measurements were made after 629 hours in the Weather-Ometer. Specifically, the conventional window exhibited an $\Delta E$ (high transmission) of 6.72 and 9.93 and an $\Delta E$ (low transmission) of 7.50 and 10.01.

EXAMPLE 4

Two windows similar to examples 1–3 were constructed except they were filled with 16 mM dimethyl-4,4'-bipyridinium bis(tetra-fluoroborate); 8 mM 5,5', 10,10'-tetrahydro, 5,5',10,10'-tetramethyl-2,2'-biphenazine; 30 mM Tinuvin P in PC with 3 wt % PMMA. A similar test as used in Example 1 above was performed except that the measurement was taken after 691 hours. These windows exhibited an ΔE (high transmission) of 4.00 and 3.74 and an ΔE (low transmission) of 4.10 and 3.60.

EXAMPLE 5

Two windows were constructed in the same manner as in Example 1 and they were filled with the same material. These windows were then subjected to continuous cycling outdoors at an angle at 5° from a horizontal condition. After approximately two years outdoors and 1.14 million cycles, the color coordinates were measured, and the ΔE (high transmission) values were determined to be approximately 7.34 and 9.00 and the ΔE (low transmission) values were determined to be 6.41 and 4.21.

EXAMPLE 6

Two windows were constructed and filled in the same manner as in Example 2 above. They were also filled with the same materials disclosed in Example 2. These windows were then subjected to continuous cycling outdoors at an angle of 5° from a horizontal condition. After approximately 1.11 million cycles, the windows exhibited an ΔE (high transmission) of 2.88 and 6.05, and an ΔE (low transmission) of 5.77 and 5.15.

EXAMPLE 7

Two conventional electrochromic windows were constructed in the same manner as in Example 3 above and filled with the same conventional electrochromic material. These windows were then continuously cycled outdoors at an angle of 5° from a horizontal condition. After about 1.11 million darkening cycles, these windows exhibited an ΔE (high transmission) of 29.97 and 22.25 and an ΔE (low transmission) of 26.21 and 20.35.

EXAMPLE 8

Electrochromic window devices were fabricated from two sheets of glass coated with a transparent conductive layer (TEC-15 glass, Libbey-Owens-Ford) and measuring approximately 2 inch by 5 inch. These substrates were bonded together by an epoxy perimeter seal containing a small gap for subsequent filling, with the conductive surfaces facing each other in a parallel, spaced-apart manner. The spacing between the electrodes was controlled by the use of spacer beads in the epoxy seal and measured approximately 250 microns. The substrates were offset from each other slightly to allow for electrical contact. The devices were then filled by standard vacuum backfilling techniques through a small fill port left in the perimeter seal with a solution comprising 34 mM methylviologen bis(tetrafluoroborate), 21.8 mM (6-(tetra-t-butylferrocenyl)hexyl)triethylammonium tetrafluoroborate, 2 mM (6-(tetra-t-butylferrocenium)hexyl)triethylammonium bis (tetrafluoroborate), 30 mM 2-(2'-hydroxy-5'-methylphenyl)-benzotriazole (Tinuvin P, Ciba Geigy), and 50 mM 2-(2'-hydroxy-3'-t-butyl-5'-n-pentylpropionate)-benzotriazole in a solution of 3% by weight polymethylmethacrylate (Elvacite™ 2051) in propylene carbonate. The fill port was then plugged with a UV curable adhesive and cured by exposure to UV light.

The electrochromic windows were then placed in an Atlas $C_{1-65}$ Weather-ometer for accelerated durability testing. Operating parameters for the Weather-ometer were set to provide continuous irradiation (0.55 W/m² at 340 nm) with a black panel temperature of ca. 70° C. and 47° C. ambient. The windows were cycled continuously between their high transmittance and low transmittance states. Each cycle consisted of application of 1.2 V DC for 30 seconds and application of 0 V DC for 30 seconds. Color coordinates (L*a*b* values) of each window were measured at approximately one week intervals in order to monitor color changes; the color changes, ΔE, for one of the devices in its high transmission state are shown in Table 1 below.

TABLE 1

| Hours | Color Change |
|---|---|
| 0 | 0.00 |
| 263 | 1.09 |
| 489 | 0.47 |
| 648 | 0.53 |
| 764 | 0.56 |
| 926 | 0.58 |
| 1091 | 1.34 |
| 1211 | 0.83 |
| 1354 | 1.17 |
| 1562 | 1.31 |
| 1709 | 0.90 |
| 1936 | 1.03 |
| 2105 | 1.14 |
| 2292 | 1.32 |
| 2509 | 1.38 |
| 2751 | 1.59 |
| 2926 | 1.33 |
| 3069 | 1.56 |
| 3215 | 1.57 |
| 3406 | 1.68 |
| 3819 | 2.27 |
| 3983 | 2.13 |
| 4146 | 2.04 |
| 4389 | 2.26 |
| 4628 | 1.91 |
| 4797 | 2.40 |
| 4963 | 2.41 |
| 5144 | 2.49 |
| 5360 | 2.06 |
| 5598 | 2.04 |
| 5821 | 2.13 |
| 5987 | 2.16 |
| 6190 | 2.21 |
| 6361 | 2.30 |
| 6545 | 2.27 |
| 6785 | 2.48 |
| 7010 | 2.90 |
| 7211 | 2.58 |
| 7401 | 2.42 |
| 7586 | 2.45 |
| 7677 | 2.26 |
| 7819 | 2.65 |
| 7946 | 3.00 |
| 8088 | 2.82 |
| 8231 | 4.94 |
| 8374 | 4.47 |
| 8517 | 4.37 |

EXAMPLE 9

Electrochromic window devices were fabricated as in the previous example. These devices were then filled as above with a solution comprising 34 mM octylviologen bis(tetrafluoroborate), 21.8 mM (6-(tetra-t-butylferrocenyl)hexyl) triethylammonium tetrafluoroborate, 2 mM (6-(tetra-t-butylferrocenium)hexyl)triethylammonium bis (tetrafluoroborate), 30 mM 2-(2'-hydroxy-5'-methylphenyl)-benzotriazole (Tinuvin P, Ciba Geigy), and 50 mM 2-(2'- hydroxy-3'-t-butyl-5'-n-pentylpropionate)-benzotriazole in a solution of 7% by weight of a 1:10 isocyanatoethyl methacrylate/methyl methacrylate copolymer in propylene carbonate. The solution also included Bisphenol A as a crosslinking agent in a 1.45 to 1 molar ratio of Bisphenol A to isocyanate functionality on the copolymer and 250 ppm of dibutyltin dilaurate as catalyst.

An electrochromic window was then placed in an Atlas $C_{1-65}$ Weather-ometer for accelerated durability testing. Operating parameters for the Weather-ometer were set to provide continuous irradiation (1.10 W/m² at 340 nm) with a black panel temperature of ca. 75° C. and 55° C. ambient. The window was cycled continuously between its high transmittance and low transmittance states. Each cycle consisted of application of 1.2 V DC for 20 seconds and application of 0 V DC for 40 seconds. Color coordinates (L*a*b* values) of the window were measured at approximately one week intervals in order to monitor color changes; the color change for one of the devices in its high transmission state are shown in Table 2 below.

TABLE 2

| Hours | Color Change |
|---|---|
| 0 | 0.00 |
| 285 | 3.02 |
| 990 | 2.72 |
| 1133 | 2.43 |
| 1292 | 2.83 |
| 1434 | 3.22 |
| 1578 | 4.66 |
| 1719 | 5.17 |
| 1862 | 3.02 |

EXAMPLE 10

Electrochromic window devices were fabricated in a similar fashion to that described in Example 8 above except that the external dimensions of the windows were 5 inch by 5 inch and the spacing between the front and rear electrodes was maintained at approximately 760 microns. The perimeter seal of these devices was composed of an inner seal and an ambient cure epoxy outer seal. No gap was provided in the seal; rather, the devices were filled via standard vacuum backfilling techniques through a small conical fill port drilled through the face of one of the glass plates. The fill solution comprised 4 mM 5,10-dimethyl-5, 10-dihydrophenazine, 6 mM octylviologen bis(tetrafluoroborate), 30 mM 2-(2'-hydroxy-5'-methylphenyl)-benzotriazole (Tinuvin P, Ciba Geigy), and 50 mM 2-(2'-hydroxy-3'-t-butyl-5'-n-pentylpropionate)-benzotriazole in a solution of 8% by weight of a 1:10 isocyanatoethyl methacrylate/methyl methacrylate copolymer in propylene carbonate. The solution also included Bisphenol A as a crosslinking agent in a 1.45 to 1 molar ratio of Bisphenol A to isocyanate functionality on the copolymer. After the fill was complete, a small Teflon ball was pressed in the fill port and a thin glass slide measuring approximately 0.5 inch by 0.5 inch was attached as a cover plate over the fill hole using a UV-curable adhesive.

The electrochromic windows were then placed in an oven at 85° C. for accelerated durability testing. Color coordinates (L*a*b* values) of the windows were measured at approximately one week intervals in order to monitor color changes; the color changes for one of the windows in its high transmission state are shown in Table 3 below.

TABLE 3

| Hours | Color Change |
|---|---|
| 0 | 0.00 |
| 88 | 4.30 |
| 157 | 5.11 |
| 245 | 5.65 |
| 314 | 5.84 |
| 403 | 5.96 |
| 563 | 7.25 |
| 755 | 6.69 |
| 899 | 6.38 |
| 1067 | 6.69 |
| 1427 | 7.44 |
| 1704 | 7.91 |
| 1864 | 8.09 |
| 2024 | 8.36 |
| 2185 | 8.75 |
| 2345 | 9.12 |
| 2515 | 9.74 |
| 2656 | 9.48 |
| 2816 | 9.82 |
| 3224 | 9.93 |

As evident from the above examples, the novel electrochromic materials exhibited significantly improved color stability.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method of making an electrochromic device comprising the steps of:
    providing an assembly including a first substrate and a second substrate spaced apart and joined by a seal to form a sealed chamber between inner surfaces of said substrates, one of said first and second substrates including an aperture extending between the outer surface of the substrate and the chamber;
    filling said chamber with an electrochromic solution or an electrolytic solution through said aperture;
    placing a plug in said aperture; and
    adhering a thin plate over the plugged aperture.

2. The method of claim 1, wherein said plug is a ball.

3. The method of claim 1, wherein said plug is deformable.

4. The method of claim 1, wherein said plug is made of one of polyisobutylene, polyolefin, and butylnitrile.

5. The method of claim 1, wherein said plug is made of tetrafluoroethylene fluorocarbon, fluorinated ethylene-propylene, ethylene tetrafluoroethylene copolymer, perfluoroalkoxy fluorocarbon, fluorinated ethylene polypropylene, or copolymers thereof.

6. The method of claim 1, wherein said thin plate is transparent to UV radiation and is adhered over the plugged aperture using a UV-curable adhesive.

7. The method of claim 1, wherein said thin plate is glass.

8. The method of claim 1, wherein said thin plate is impermeable to oxygen.

9. The method of claim 1, wherein said aperture has a conical shape.

10. An electrochromic device made using the method of claim 1.

11. A window comprising an electrochromic device made using the method of claim 1.

12. An electrochromic device comprising:
   a first substrate and a second substrate spaced apart and joined by a seal to form a sealed chamber between inner surfaces of said substrates, one of said first and second substrates including an aperture extending between the outer surface of the substrate and said chamber;
   an electrochromic medium disposed in said chamber;
   a plug disposed in said aperture; and
   a thin plate disposed over the plugged aperture.

13. The electrochromic device of claim 12, wherein said plug is a ball.

14. The electrochromic device of claim 12, wherein said plug is a soft deformable ball.

15. The electrochromic device of claim 14, wherein said ball is made of one of polyisobutylene, polyolefin, and butylnitrile.

16. The electrochromic device of claim 14, wherein said ball is made of tetrafluoroethylene fluorocarbon, fluorinated ethylene-propylene, or copolymers thereof.

17. The electrochromic device of claim 12, wherein said thin plate is transparent to UV radiation and is adhered to the outer surface of one of said substrates using a UV-curable adhesive.

18. The electrochromic device of claim 12, wherein said thin plate is a microscope slide.

19. The electrochromic device of claim 12, wherein said thin plate is impermeable to oxygen.

20. The electrochromic device of claim 12, wherein said aperture has a conical shape.

21. A window comprising the electrochromic device of claim 12.

22. The window of claim 21 and further comprising:
   a first glass pane;
   a second glass pane; and
   a spacer for spacing and maintaining said first and second glass panes in a parallel, spaced-apart relation,
   said electrochromic device is disposed between and spaced apart from said first and second glass panes thereby defining a first chamber between said first glass pane and said electrochromic device, and a second chamber between said second glass pane and said electrochromic device.

* * * * *